United States Patent
Nakanishi et al.

[11] 3,723,442
[45] Mar. 27, 1973

[54] 3-OXO-1-OXA-4,8-DIAZASPIRO(4.5)DECANES

[75] Inventors: Michio Nakanishi, Oita; Katsuo Arimura, Fukuoka; Hideki Ao, Oita, all of Japan

[73] Assignee: Yoshitomi Pharmaceutical Industries, Ltd., Osaka, Japan

[22] Filed: Dec. 31, 1970

[21] Appl. No.: 103,322

[52] U.S. Cl......260/293.66, 260/244 R, 260/293.51, 260/293.74, 260/293.75, 260/293.76, 260/293.78, 260/293.79, 260/293.86, 260/293.87, 260/293.88, 260/520, 260/521 R, 260/535 R, 260/559 R, 260/559 D, 260/561 B, 260/562 R, 260/562 A, 424/248, 424/267

[51] Int. Cl. ............................................ C07d 99/02
[58] Field of Search ...................... 260/244 R, 293.66

[56] References Cited

UNITED STATES PATENTS 3,481,942  12/1969  Loev ................................. 260/294.7
3,574,204  4/1971  Nakanishi et al. ..................... 260/243

*Primary Examiner*—Henry R. Jiles
*Assistant Examiner*—G. Thomas Todd
*Attorney*—Sughrue, Rothwell, Mion, Zinn & Macpeak

[57] ABSTRACT

3-oxo-1-oxa-4,8-diazaspiro[4.5]decanes having the general formula

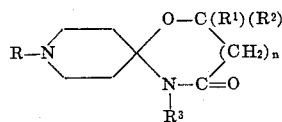

wherein R, $R^1$, $R^2$, $R^3$ and $n$ are defined hereinafter, their pharmaceutically acceptable acid addition salts thereof and methods for the preparation of said compounds are disclosed. The compounds are used as agents having strong reserpine antagonistic activity and agents for lowering the blood sugar level.

7 Claims, No Drawings

3-OXO-1-OXA-4,8-DIAZASPIRO(4.5)DECANES

SUMMARY OF THE INVENTION

This invention relates to novel and therapeutically valuable 3-oxo-1-oxa-4,8-diazaspiro[4.5]decanes of the formula

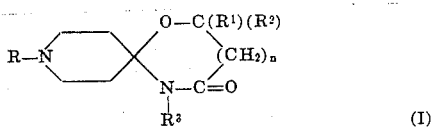

(I)

or the pharmaceutically acceptable acid addition salts thereof, wherein R is H, acetyl, allyl, 2-propynyl, 2-cyanoethyl, $C_{1-4}$ alkyl (for example, methyl, ethyl, propyl or butyl), $C_{1-4}$ alkoxycarbonyl, $C_{1-4}$ alkoxycarbonylethyl, benzoyl, benzyl or phenethyl, each of $R^1$ and $R^2$ is H, methyl, ethyl or phenyl, $R^3$ is H, $C_{1-4}$ alkyl, benzyl, phenyl or substituted phenyl, the substituent being selected from the group consisting of Cl, $CH_3$, $CH_3O$ or $CF_3$, and $n$ is 0 or 1.

DETAILED DESCRIPTION OF THE INVENTION

The compounds (I) can be produced by the following methods:

i. By the reaction of a compound of the formula

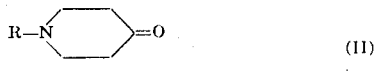

(II)

or a salt thereof such as a hydrochloride with a compound of the formula

$$HO-C(R^1)(R^2) - (CH_2)_n - CONHR^3 \quad (III)$$

The reaction is usually carried out in a solvent such as benzene, toluene, xylene or dioxane in the presence of an acid catalyst such as p-toluenesulfonic, benzenesulfonic, sulfuric or phosphoric acid at refluxing temperatures to remove the water formed, or in a solvent such as ethanol, chloroform, tetrahydrofuran, benzene, toluene or xylene in the presence of a dehydrating agent such as calcium oxide, anhydrous magnesium sulfate, anhydrous zinc chloride, molecular sieves or N,N'-dicyclohexylcarbodiimide at room temperature or at an elevated temperature;

ii. By the reaction of a compound of formula (II) or a salt thereof with a compound of the formula $$HO-C(R^1)(R^2) - (CH_2)_n - COOH \quad (IV)$$

and a compound of the formula $$R^3-NH_2 \quad (V)$$

or a salt thereof, for example, ammonium carbonate.

The reaction is usually carried out in a solvent such as benzene, toluene, xylene, chloroform or ethanol in the presence of an acid catalyst such as p-toluenesulfonic, benzenesulfonic, hydrochloric or sulfuric acid for several to several tens of hours while removing the water formed.

In this reaction, an intermediate having the following formula (VI) is firstly formed by the reaction of compound (II) with compound (V).

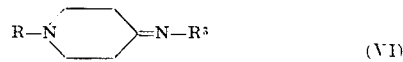

(VI)

The intermediate (VI) can be separated and then subjected to the next reaction, i.e., reaction with compound (IV). The separation, however, is not always necessary.

iii. By the reaction of a compound of the formula

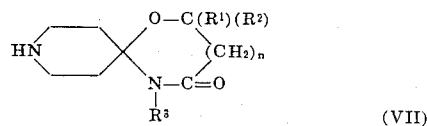

(VII)

with a compound of the formula $$R'-Y \quad (VIII)$$

wherein R' is acetyl, allyl 2-propynyl, 2-cyanoethyl, $C_{1-4}$ alkyl, $C_{1-4}$ alkoxycarbonyl, $C_{1-4}$ alkoxycarbonylethyl, benzoyl, benzyl or phenethyl, and Y is a halogen atom or a reactive radical such as methylsulfonyloxy or p-tolylsulfonyloxy.

The reaction is usually carried out in a solvent such as ethanol, dimethylformamide, acetone, benzene, toluene, xylene, ethyl acetate, tetrahydrofuran or dioxane in the presence of an alkalizing agent such as an alkali metal carbonate, an alkali metal hydrogen carbonate, an alkali metal hydroxide, and alkali metal alkoxide, triethylamine, diethylaniline, dimethylaniline or pyridine at refluxing temperatures for several to several tens of hours.

The compounds (I) where R is H are produced also by the following method: iv. By the removal of the R'' group of compounds of the formula

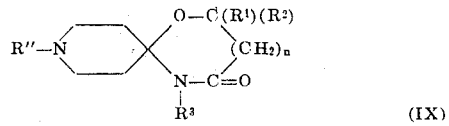

(IX)

wherein R'' is benzyl or $C_{1-4}$ alkoxycarbonyl.

The removal of the benzyl group is carried out by subjecting compound (IX) (R'' being benzyl) to catalytic reduction using a catalyst such as palladium charcoal, palladium oxide or Raney-nickel in a solvent such as water, methanol, ethanol, isopropanol, dioxane or acetic acid under normal or increased pressure at room temperature to about 100°C for from 1 to 20 hours.

The removal of $C_{1-4}$ alkoxycarbonyl is carried out by treating compound (IX) (R'' being $C_{1-4}$ alkoxycarbonyl) with an acid such as hydrogen chloride, hydrogen bromide, hydrogen fluoride, perchloric acid or trifluoroacetic acid in a solvent, especially with from 10 to 20 percent hydrogen bromide in acetic acid, the decomposition of the spiro ring being avoided under anhydrous conditions, or with an alkali such as sodium hydroxide, potassium hydroxide, barium hydroxide, calcium hydroxide or magnesium hydroxide in a solvent such as water, methanol, ethanol or ethylene glycol at refluxing temperatures for 1 to 25 hours.

The compounds of formula (I) can be converted into the corresponding acid addition salts in a conventional manner by treatment with various inorganic and organic acids, for example, hydrochloric, hydrobromic, sulfuric, phosphoric, oxalic, fumaric, maleic, tartaric, citric, malonic and o- (p-hydroxybenzoyl)benzoic acids and also phenolphthalin.

The compounds of formula (I) and their pharmaceutically acceptable acid addition salts have strong reserpine antagonistic activity and blood sugar lowering action as shown, for example, by the following tests.

1. Reserpine Antagonistic Activity

The test for reserpine antagonistic activity was performed essentially in accordance with the method described by R. Fielden et al. in *Methods in Drug Evaluation*, pages 149–157 (North-Holland Publishing Company, Amsterdam, 1966; editors: P. Mantegazza and Piccinini). $RD_{30}$ is the subcutaneous dose of the test compound which prevents ptosis caused by the administration of reserpine in 30 percent of the dd-strain mice (female, 20–25 g).

| Compound | Reserpine Antagonistic Activity $RD_{30}$ mg/kg |
|---|---|
| A | 20–40 |
| B | 10–20 |
| C | 10–20 |
| D | 80 |
| E | 80 |
| F | 20–40 |

The compounds A-F above are shown below:
- A: 2-Methyl-3-oxo-1-oxa-4,8-diazaspiro[4.5]decane Hydrochloride
- B: 3-Oxo-2-phenyl-1-oxa-4,8-diazaspiro[4.5]decane Hydrobromide
- C: 8-Ethyoxycarbonyl-2-methyl-3-oxo-1-oxa-4,8-diazaspiro[4.5]decane
- D: 2-Methyl-3-oxo-8-phenethyl-1-oxa-4,8-diazaspiro[4.5]decane Hydrochloride
- E: 8-Benzoyl-2-methyl-3-oxo-1-oxa-4,8-diazaspiro[4.5]decane
- F: 8-(2-Cyanoethyl)-2-methyl-3-oxo-1-oxa-4,8-diazaspiro[4.5]decane Maleate 2. Blood Sugar Lowering ACtion in Glucose Fed Mice The test compound (2-methyl-3-oxo-1-oxa-4,8-diazaspiro [4.5]decane) was administered orally to dd-strain mice (female, 20–25 g) starved overnight. One hour later 4 g per kg of body weight of glucose was administered orally to the mice and, after one additional hour, the blood sugar value was measured. The $ED_{20}$ value [dose required to lower the blood sugar level by 20 percent against the glucose fed mice (control)] was 5 mg/kg.

In view of various tests including those described above, the compounds (I) of the invention and their salts can be administered safely for the treatment of mania, diabetes and prediabetes, in the form of a pharmaceutical preparation with a suitable and conventional carrier or adjuvant, administerable orally or by way of injection, without harm to the patients.

The pharmaceutical preparations can take any conventional form such as tablets, capsules, granules, powder, syrups, injectable solutions and the like.

FORMULATION EXAMPLE 25 mg and 50 mg tablets are prepared from the following composition:

| | 25 mg Tablets | 50 mg Tablets |
|---|---|---|
| Compound (I) | 25 mg | 50 mg |
| Lactose | 70 mg | 65 mg |
| Microcrystalline Cellulose | 15 mg | 17 mg |
| Starch | 18 mg | 15 mg |
| Methylcellulose | 1 mg | 1.5 mg |
| Magnesium Stearate | 1 mg | 1.5 mg |
| | 130 mg | 150 mg |

The oral daily dose of Compound (I) or a salt thereof for human adults usually ranges from about 50 to 300 milligrams, in single or multiple doses.

In the following illustrative examples of typical and presently preferred embodiments of the invention, "g" and "ml" represent "gram(s)" and "milliliter(s)", respectively.

EXAMPLE 1

A solution of 10 g of 1-ethoxycarbonyl-4-piperidone, 5.4 g of lactamide and 1 ml of concentrated sulfuric acid in 200 ml of benzene is heated under reflux in a flask provided with a water-removing apparatus for 16 hours. After cooling, the reaction mixture is washed twice with 30 ml of about 10 percent aqueous sodium hydrogen sulfite solution and then with water. The mixture is dried over anhydrous magnesium sulfate, and then the solvent is distilled off under reduced pressure. The yellow-brown residue thus obtained in recrystallized from a mixture of benzene and ligroin to give 3.1 g of white crystalline 8-ethoxycarbonyl-2-methyl-3-oxo-1-oxa-4,8-diazaspiro[4.5]decane melting at 103°–105°C.

EXAMPLE 2

A solution of 80 g of 1-ethoxycarbonyl-4-piperidone, 71 g of dl-mandelamide and 1 g of p-toluenesulfonic acid in 700 ml of toluene is heated under reflux with stirring in a flask provided with a water-removing apparatus for 12 hours. After cooling, the reaction mixture is washed twice with water, dried over anhydrous sodium sulfate, and the solvent is distilled off under reduced pressure. The dark brown jelly-like residue solidifies on cooling. The solid is washed with a small amount of isopropanol and recrystallized from isopropanol to give 90 g of white crystalline 8-ethoxycarbonyl-3-oxo-2-phenyl-1-oxa-4,8-diazaspiro[4.5]decane melting at 140°–141°C.

EXAMPLE 3

A mixture of 12.5 g of 3-oxo-2-phenyl-1-oxa-4,8-diazaspiro[4.5]decane hydrobromide, 7 g of butyl bromide, 10 g of potassium carbonate, 100 ml of dimethylformamide and 30 ml of ethanol is heated under reflux with stirring for 6 hours. After cooling, the insoluble matter is filtered off and the filtrate is concentrated under reduced pressure. The solid thus obtained is washed with water and recrystallized from isopropanol to give 10 g of white crystalline 8-butyl-3-oxo-2-phenyl-1-oxa-4,8-diazaspiro[4.5]decane melting at 146°C. Its maleate melts at 206°–207°C.

EXAMPLE 4

Benzoyl chloride (5.1 g) is added portionwise to a mixture of 7.5 g of 2-methyl-3-oxo-1-oxa-4,8-diazapiro[4.5]decane hydrochloride, 7 g of potassium carbonate, 50 ml of dimethylformamide and 50 ml of toluene. The resulting mixture is stirred at room temperature for 1 hour and then heated under reflux for 9 hours. After cooling, the insoluble matter is filtered off and the filtrate is concentrated under reduced pressure. The residue is dissolved in chloroform, the solution is washed twice with saturated sodium chloride solution, dried over anhydrous magnesium sulfate, the chloroform is distilled off, and the pale brown solid thus obtained is recrystallized twice from toluene to give 6 g of white crystalline 8-benzoyl-2-methyl-3-oxo-1-oxa-4,8-diazaspiro[4.5]decane melting at 175°–176°C.

EXAMPLE 5

To a solution of 10 g of 8-benzyl-2-methyl-3-oxo-1-oxa-4,8-diazaspiro[4.5]decane in 120 ml of 50 percent ethanol containing 10 ml of concentrated hydrochloric acid is added 3 g of 10 percent palladium charcoal and the resulting mixture is reduced under normal pressure at room temperature until the absorption of hydrogen stops. After the reduction, the palladium charcoal is filtered off, and the filtrate is concentrated under reduced pressure. The white crystals thus obtained are recrystallized from ethanol to give 4 g of white crystalline 2-methyl-3-oxo-1-oxa-4,8-diazaspiro[4.5]decane hydrochloride melting at 240°C.

EXAMPLE 6

To a solution of 15 g of 8-benzyl-4-butyl-2-methyl-3-oxo-1-oxa-4,8-diazaspiro[4.5]decane hydrochloride in 250 ml of 50 percent ethanol is added 6 g of 5 percent palladium charcoal, the resulting mixture is placed in an autoclave, the autoclave is charged with hydrogen at 80 atmospheres, and then the reduction is carried out at 60°C for 1 hour. After cooling, the palladium charcoal is filtered off, water is added to the filtrate, and the aqueous solution is made alkaline with potassium carbonate. The oil separated is extracted with chloroform, the extract is washed with water, dried over magnesium sulfate, and the chloroform is distilled off. The pale yellow viscous oil (7.5 g) thus obtained is dissolved in 30 ml of ethanol, and 3.9 g of maleic acid is added to the solution. After cooling, the crystals precipitated are separated and recrystallized from ethanol to give 5 g of white crystalline 4-butyl-2-methyl-3-oxo-1-oxa-4,8-diazaspiro[4.5]decane maleate melting at 175°–176°C.

EXAMPLE 7

A mixture of 10 g of 4-p-chlorophenyl-2,2-dimethyl-8-ethoxycarbonyl-3-oxo-1-oxa-4,8-diazaspiro[4.5]decane and 100 ml of 20 percent solution of hydrogen bromide in acetic acid is heated on a water bath for 3 hours. After cooling, the acetic acid is distilled off under reduced pressure and the solid thus obtained is recrystallized from ethanol to give 6.5 g of white crystalline 4-p-chlorophenyl-2,2-dimethyl-3-oxo-1-oxa-4,8-diazaspiro[4.5]decane hydrobromide melting at 320°–321°C with decomposition.

EXAMPLE 8

A mixture of 10 g of 4-p-chlorophenyl-2,2-dimethyl-8-ethoxycarbonyl-3-oxo-1-oxa-4,8-diazaspiro[4.5]decane, 15 g of barium hydroxide octahydrate and 150 ml of ethylene glycol is heated under reflux with stirring for 16 hours. After cooling, the insoluble matter is filtered off, water is added to the filtrate, and the resulting solution is extracted three times with chloroform. The combined extract layer is washed three times with water and dried over anhydrous magnesium sulfate, and then the solvent is distilled off. The pale brown solid thus obtained is recrystallized from toluene to give 4.5 g of white crystalline 4-p-chlorophenyl-2,2-dimethyl-3-oxo-1-oxa-4,8-diazaspiro[4.5]decane melting at 141°–142°C.

EXAMPLE 9

A mixture of 77 g of 1-ethoxycarbonyl-4-piperidone, 56.5 g of p-chloroaniline, 0.5 g of p-toluenesulfonic acid and 400 ml of toluene is heated under reflux with stirring in a flask provided with a water-removing apparatus for 9 hours. After cooling to room temperature, 50 g of $\alpha$-hydroxy-isobutyric acid is added, and the mixture is heated under reflux for 9 additional hours. After cooling, the reaction mixture is washed successively with water, aqueous sodium carbonate, water, diluted hydrochloric acid, water, acqueous sodium hydrogen sulfite and water, and dried over anhydrous magnesium sulfate. Then the toluene is distilled off. The brown solid thus obtained is washed with isopropyl ether and recrystallized from ethanol to give white crystalline 4-p-chlorophenyl-2,2-dimethyl-8-ethoxycarbonyl-3-oxo-1-oxa-4,8-diazaspiro[4.5]decane melting at 206°–207°C.

EXAMPLE 10

A mixture of 85.5 g of 1-ethoxycarbonyl-4-piperidone, 54 g of lactic acid, 65.5 g of ammonium carbonate, 0.5 g of p-toluenesulfonic acid and 500 ml of toluene is heated under reflux in a flask provided with a water-removing apparatus for 16 hours. After cooling, the reaction mixture is washed successively with water, aqueous sodium hydrogen carbonate, water, diluted hydrochloric acid, water, aqueous sodium hydrogen sulfite and water, and dried over anhydrous magnesium sulfate. Then the toluene is distilled off. To the brown jelly-like residue is added isopropyl ether and crystallization is induced by scratching the flask. The crystals are collected by filtration and recrystallized from isopropyl ether to give white crystalline 8-ethoxy-carbonyl-2-methyl-3-oxo-1-oxa-4,8-diazaspiro[4.5]decane melting at 107°–108°C.

Using the procedures set forth in above examples, but substituting equivalent amounts of the appropriate starting materials, the following compounds are also produced:

1. 3-Oxo-1-oxa-4,8-diazaspiro[4.5]decane, its hydrobromide melting at 231°–232°C;
2. 3-Oxo 4-m-trifluoromethylphenyl-1-oxa-4,8-diazaspiro[4.5]-decane, its maleate melting at 215°C;
3. 2,4-Dimethyl-3-oxo-1-oxa-4,8-diazaspiro[4.5]decane, its hydrobromide melting at 215°–216°C;

4. 2-Methyl-3-oxo-4-phenyl-1-oxa-4,8-diazaspiro[4.5]decane melting at 80°–81°C, its hydrochloride melting at 314°C with decomposition, and its maleate melting at 220°C;

5. 2-Methyl-3-oxo-4-m-trifluoromethylphenyl-1-oxa-4,8-diazaspiro[4.5]decane, its maleate melting at 199°C;

6. 2-Ethyl-3-oxo-1-oxa-4,8-diazaspiro[4.5]decane, its hydrobromide melting at 226°C;

7. 3-Oxo-2-phenyl-1-oxa-4,8-diazaspiro[4.5]decane, its hydrobromide melting at 261°C;

8. 4-Methyl-3-oxo-2-phenyl-1-oxa-4,8-diazaspiro[4.5]decane, its maleate melting at 171°C;

9. 4-p-Methoxyphenyl-3-oxo-2-phenyl-1-oxa-4,8-diazaspiro [4.5]decane, its hydrochloride melting at 280°–281°C with decomposition;

10. 4-Benzyl-3-oxo-2-phenyl-1-oxa-4,8-diazaspiro[4.5]decane, its hydrobromide melting at 142°–144°C;

11. 4-Oxo-2-phenyl-1-oxa-5,9-diazaspiro[5.5]undecane, its hydrochloride melting at 242°C with decomposition;

12. 2,2-Dimethyl-3-oxo-1-oxa-4,8-diazaspiro[4.5]decane, its hydrobromide melting at 283°C with decomposition;

13. 2-Methyl-3-oxo-2phenyl-1-oxa-4,8-diazaspiro[4.5]decane melting at 227°C;

14. 2,2-Diphenyl-3-oxo-1-oxa-4,8-diazaspiro[4.5]decane melting at 214°–215°C;

15. 4-Butyl-2,2-diphenyl-3-oxo-1-oxa-4,8-diazaspiro[4.5]decane, its maleate melting at 176°–177°C;

16. 8-Methyl-3-oxo-2-phenyl-1-oxa-4,8-diazaspiro[4.5]decane melting at 188°–189°C, and its maleate melting at 222°C;

17. 2,8-Dimethyl-3-oxo-1-oxa-4,8-diazaspiro[4.5]decane, its maleate melting at 207°C;

18. 8-Butyl-2-methyl-3-oxo-1-oxa-4,8-diazaspiro[4.5]decane, its hydrochloride melting at 256°C with decomposition;

19. 8-Acetyl-2-methyl-3-oxo-1-oxa-4,8-diazaspiro[4.5]decane melting at 154°–155°C;

20. 8-Acetyl-2,2-diphenyl-3oxo-1-oxa-4,8-diazaspiro[4.5]decane melting at 247°C;

21. 8-Allyl-2-methyl-3-oxo-1-oxa-4,8-diazaspiro[4.5]decane its maleate melting at 155°C;

22. 2-Methyl-3-oxo-8-(2-propynyl)-1-oxa-4,8-diazaspiro[4.5]-decane, its maleate melting at 162°–163°C;

23. 8-(2-Cyanoethyl)-2-methyl-3-oxo-1-oxa-4,8-diazaspiro[4.5]decane, its maleate melting at 195°C;

24. 8-Ethoxycarbonyl-3-oxo-1-oxa-4,8-diazaspiro[4.5]decane melting at 99°–100°C;

25. 8-Ethoxycarbonyl-2-ethyl-3-oxo-1-oxa-4,8-diazaspiro[4.5]decane melting at 99°–101°C;

26. 2,2-Diphenyl-8-ethoxycarbonyl-3-oxo-1-oxa-4,8-diazaspiro[4.5]decane melting at 174°–175°C;

27. 8-Ethoxycarbonyl-2-methyl-3-oxo-2-phenyl-1-oxa-4,8-diazaspiro[4.5]decane melting at 117°–118°C;

28. 2,2-Dimethyl-8-ethoxycarbonyl-3-oxo-1-oxa-4,8-diazaspiro[4.5]decane melting at 186°C;

29. 4-Butyl-8-ethoxycarbonyl-2-methyl-3-oxo-1-oxa-4,8-diazaspiro[4.5]decane showing $n_D^{24}$ 1.4660 (colorless liquid);

30. 2,4-Dimethyl-8-ethoxycarbonyl-3-oxo-1-oxa-4,8-diazaspiro[4.5]decane melting at 70°–72°C;

31. 9-Ethoxycarbonyl-4-oxo-2-phenyl-1-oxa-5,9-diazaspiro[5.5]-undecane melting at 177°–178°C;

32. 8-(2-Methoxycarbonylethyl)-2-methyl-3-oxo-1-oxa-4,8-diazaspiro[4.5]decane its maleate melting at 137°–139°C;

33. 8-Benzoyl-3-oxo-2-phenyl-1-oxa-4,8-diazaspiro[4.5]decane melting at 196°–197°C;

34. 8-Benzyl-2-methyl-3-oxo-1-oxa-4,8-diazaspiro[4.5]decane, its hydrochloride melting at 251°C;

35. 8-Benzyl-2,2-diphenyl-3-oxo-1-oxa-4,8-diazaspiro[4.5]decane melting at 205°C;

36. 8-Benzyl-3-oxo-2-phenyl-1-oxa-4,8-diazaspiro[4.5]decane, its maleate melting at 234°C with decomposition;

37. 8-Benzyl-4-p-chlorophenyl-2,2-dimethyl-3-oxo-1-oxa-4,8-diazaspiro[4.5]decane melting at 168°–169°C;

38. 9-Benzyl-4-oxo-2-phenyl-1-oxa-5,9-diazaspiro[5.5]undecane melting at 189°–190°C;

39. 2-Methyl-3-oxo-8-phenethyl-1-oxa-4,8-diazaspiro[4.5]decane, its hydrochloride melting at 265°C with decomposition;

40. 3-Oxo-8-phenethyl-2-phenyl-1-oxa-4,8-diazaspiro[4.5]decane, its hydrochloride melting at 233°–234°C.

What is claimed is:

1. A compound selected from the group consisting of those of the forumula wherein R is selected from the group consisting of a hydrogen atom, an acetyl group, an allyl group, a 2-propynyl group, a 2-cyanoethyl group, an alkyl group having from one to four carbon atoms, an alkoxycarbonyl group, said alkoxy group having from one to four carbon atoms, an alkoxycarbonylethyl group, said alkoxy group having from one to four carbon atoms, a benzoyl group, a benzyl group and a phenethyl group, wherein each of $R^1$ and $R^2$ is selected from the group consisting of a hydrogen atom, a methyl group, an ethyl group and a phenyl group, wherein $R^3$ is selected from the group consisting of a hydrogen atom, an alkyl group having from one to four carbon atoms, a benzyl group, a phenyl group and a substituted phenyl group, said substituent being selected from the group consisting of Cl, $CH_3$, $CH_3O$ and $CF_3$, and wherein n is 0 or 1; and the pharmaceutically acceptable acid addition salts thereof.

2. The compound of claim 1, wherein said compound is 2-methyl-3-oxo-1-oxa-4,8-diazaspiro[4.5]decane.

3. The compound of claim 1, wherein said compound is 3-oxo-2-phenyl-1-oxa-4,8-diazaspiro[4.5]decane.

4. The compound of claim 1, wherein said compound is 8-ethoxy-carbonyl-2-methyl-3-oxo-1-oxa-4,8-diazaspiro[4.5]decane.

5. The compound of claim 1, wherein said compound is 2-methyl-3-oxo-8-phenethyl-1-oxa-4,8-diazaspiro[4.5]decane.

6. The compound of claim 1, wherein said compound is 8-benzoyl-2-methyl-3-oxo-1-oxa-4,8-diazaspiro[4.5]decane.

7. The compound of claim 1, wherein said compound is 8-(2-cyanoethyl)-2-methyl-3-oxo-1-oxa-4,8-diazaspiro[4.5]decane.

* * * * *